ically, the catalyst is made of an oxide of a metal selected from the group of zirconium, thorium, cerium, zinc, and chromium, whereby not only is the yield of the N-vinylpyrrolidone significantly improved, but the reaction can be carried out at atmospheric pressure.

United States Patent [19]
Kanetaka et al.

[11] 3,821,245
[45] June 28, 1974

[54] PRODUCTION OF N-VINYL PYRROLIDONE

[75] Inventors: Junichi Kanetaka; Takashi Shimodiara; Kuniaki Hayashi, all of Ami-Machi, Japan

[73] Assignee: Mitsubishi Petrochemical Company Limited, Tokyo-to, Japan

[22] Filed: July 19, 1971

[21] Appl. No.: 164,138

[30] Foreign Application Priority Data
July 17, 1970 Japan.............................. 45-62681
Feb. 28, 1971 Japan.............................. 46-7080

[52] U.S. Cl......... 260/326.5 FN, 252/462, 252/467, 252/475, 252/461
[51] Int. Cl............................................ C07d 27/08
[58] Field of Search............................ 260/326.5 FN

[56] References Cited
UNITED STATES PATENTS
3,377,340    4/1968    Hartwimmer et al............ 260/239.3
3,526,620    9/1970    Bestian et al..................... 260/239.3

*Primary Examiner*—Joseph A. Narcavage
*Attorney, Agent, or Firm*—Robert E. Burns; Emmanuel J. Lobato; Bruce L. Adams

[57] ABSTRACT

In a method for producing N-vinylpyrrolidone by dehydrating N-(β-hydroxyethyl)-2-pyrrolidone employing a catalyst, the catalyst is made of an oxide of a metal selected from the group of zirconium, thorium, cerium, zinc, and chromium, whereby not only is the yield of the N-vinylpyrrolidone significantly improved, but the reaction can be carried out at atmospheric pressure.

7 Claims, No Drawings

PRODUCTION OF N-VINYL PYRROLIDONE

BACKGROUND OF THE INVENTION

This invention relates to a method for producing N-vinylpyrrolidone through catalytic dehydration of N-($\beta$-hydroxyethyl)-2-pyrrolidone, and more particularly to a method as stated which is characterized by the type of the catalyst.

N-vinylpyrrolidone is an important compound as a starting monomer material for the production of polyvinylpyrrolidones which are widely used polymers in various fields of chemical industries.

Although the N-vinylpyrrolidone is presently produced by utilizing the "Reppe Reaction" combining 2-pyrrolidone and acetylene, there exist various difficulties in the "Reppe Reaction" employing acetylene, and hence various alternative methods have been proposed for eliminating such difficulties.

One of the methods not following the Reppe procedure is that comprising the dehydration of N-($\beta$-hydroxyethyl)-2-pyrrolidone. For instance, this substance is first caused to react with thionyl chloride to obtain N-($\beta$-chloroethyl)-2-pyrrolidone and then dehydrochlorinated therefrom as taught in U.S. Pat. No. 2,775,599, or the substance is reacted with acetic anhydride to obtain an ester, and then acetic acid is removed therefrom as taught in U.S.S.R. Pat. No. 125,567.

A method for directly dehydrating the N-($\beta$-hydroxyethyl)-2-pyrrolidone without producing the above described intermediate products is also known. More specifically, in U.S. Pat. No. 2,669,570, there is disclosed a method wherein N-($\beta$-hydroxyethyl)-2-pyrrolidone is dehydrated in the presence of an active alumina catalyst, at a temperature of from 300° to 340°C, with a space velocity of from 500 to 4,000/hr and at a pressure of lower than 100 mg Hg, whereupon N-Vinylpyrrolidone is obtained in a yield of 82 percent. This method is significant in that a one-stage catalytic dehydration is thereby afforded instead of the above described conventional methods producing intermediate products. However, putting this method into practice is rather difficult because the reaction must be carried out under a considerable low pressure of less than 100 mm Hg.

SUMMARY OF THE INVENTION

Therefore, a primary object of the present invention is to provide a method for producing N-vinylpyrrolidone wherein the above described difficulties are substantially overcome.

Another object of the present invention is to provide a method for producing N-vinylpyrrolidone wherein catalytic dehydration can be carried out under atmospheric pressure.

Still another object of the present invention is to provide a method for producing N-vinylpyrrolidone wherein the catalyst can be obtained economically and can be reactivated even after a comparatively long period by use.

An additional object of the present invention is to provide a method for producing N-vinylpyrrolidone in the presence of a catalyst wherein the yield is substantially high.

These and other object of the present invention csn be achieved by a method for producing N-vinylpyrrolidone wherein the catalyst employed for the dehydration of N-($\beta$-hydroxyethyl)-2-pyrrolidone is an oxide of a metal selected from the group consisting of zirconium, thorium, cerium, zinc, and chromium.

The nature, principle, and utility of the present invention will be better understood from the following detailed description with respect to preferred embodiments thereof.

DETAILED DESCRIPTION

As described hereinbefore, a specific catalyst is employed in this invention is dehydrating the N-($\beta$-hydroxyethyl)-2-pyrrolidone preferably under atmospheric pressure, whereby N-vinylpyrrolidone can be produced in an yield of more than 90 mole percent. Furthermore, a main by product of 2-pyrrolidone which is also highly valuable is produced in addition to the N-vinylpyrroldione and the total yield of both products can be as high as 95 mole percent.

In this case, problems of production of polymers which have been frequently experienced in the methods employing an alumina catalyst is substantially elminated, thus eliminating the possibility of the catalyst being inactivated due to deposition of carbon on the surface of the catalyst.

In fact, after 50 hours of the reaction, only a slight deterioration of the activity has been observed. Furthermore, when the activity of the catalyst according to the present invention deteriorates, it can be recovered completely by passing a gas containing molecular oxygen through the catalyst for a period of from 1 to 4 hours at a temperature of from 400° to 700°C.

The catalyst used in the present invention for obtaining the above described advantageious features is an oxide of a metal selected from the group consisting of zirconium, thorium, cerium, zinc, and chromium. More specifically, the oxide may be of a type containing a single metal, such as zirconia, thoria, ceria, zinc oxide, and chromia, or it may be a type containing more than one metal. Otherwise, the oxide may consist of a mixture of these types of metal oxides, or may include a suitalbe auxiliary catalyst.

Such a catalyst can be produced by any of various methods. One typical method is the dehydration of hydroxides of the above described metals. For instance, a hydroxide of a metal which can be obtained when a nitrate thereof in reacted with an alkali or by any other method is heated to a temperature in a range of 100° to 500°C to cause the dehydration, and the oxide thus obtained is thereafter formed into a suitable shape and size and sintered at a temperature of from 500° to 1,200°C, whereupon a catalyst of a desired shape is obtained.

In the above described procedure, if the heating or calcining temperature is too low, excessive hydroxide will tend to be left unconverted, and when such a catalyst is employed, the yield of the N-vinylpyrrolidone will be thereby lowered. On the other hand, if the heating temperature is too high, the surface area of the catalyst will tend to be reduced, and the activity of the catalyst will also be reduced. It is of course possible for a metal oxide to be produced by some other suitable method, and a catalyst produced from such a metal oxide to be employed in the production of the N-vinylpyrrolidone.

Although the catalyst is highly active and has a comparatively long working life, there may come a time when the activity of the catalyst is considerably lowered and for the recovery of the activity, the catalyst is subjected to a heat treatment under an oxidizing atmosphere.

When the N-vinylpyrrolidone is produced through the utilization of the catalyst, it is desired that the N-($\beta$-hydroxyethyl)-2-pyrrolidone be dehydrated at a temperature in a range of from 250° to 500°C, preferably from 300° to 450°C. While it is possible, of course, to carry out dehydration at a temperature lower than 250°C, the reaction velocity in this case becomes too low. On the other hand when the dehydration is carried out at a temperature higher than the 500°C, excessive side-reactions tend to occur.

The pressure at the time of the reaction may be from subatmospheric to superatmospheric pressure. However, the advantageous features of the present invention may be utilized most advantageously under atmospheric pressure.

The space velocity of the N-($\beta$-hydroxyethyl)-2-pyrrolidone which is to be dehydrated can be selected at will with a certain relationship to the reaction temperature. Generally speaking, a space velocity of from 500 to 5,000/hour is considered to be suitable.

Furthermore, the N-($\beta$-hydroxyethyl)-2-pyrrolidone is preferably dehydrated after it is diluted with an addition of an inert gas such as nitrogen gas until its concentration is reduced to 50 mole percent or less, and any concentration higher than the 50 mole percent significantly reduces the activity of the catalyst due to deposition of carbon. As is described hereinbefore, the activity of the catalyst according to the present invention, which has thus deteriorated, can be recovered by passing a gas containing molecular oxygen such as air through the catalyst bed at a temperature ranging from 400° to 700°C for about 2 to 5 hours.

When the N-($\beta$-hydroxyethyl)-2-pyrrolidone is dehydrated by employing a catalyst according to the present invention, not only is the yield the N-vinylpyrrolidone sufficiently high, but the main by-product thus obtained is also 2-pyrrolidone. Separation of these products is very easy. Furthermore, the starting material N-($\beta$-hydroxyethyl)-2-pyrrolidone can be easily produced by a reaction of, for instance, $\gamma$-butyrolactone and monoethanolamine.

Reference Example

At the upper part of an elongated reaction tube of 25.4-mm inner diameter and 340-mm length made of stainless steel, 80 cc of Raschig rings of 5-mm outer diameter and 5-mm length made of porcelain were filled to form a preheating and evaporating zone for N-($\beta$-hydroxyethyl)-2-pyrrolidone. The lower part of the reaction tube was filled with about 30 cc of a catalyst consisting of alumina available on the market to constitute a reaction zone.

The preheating zone and the reaction zone of the reaction tube were heated from outside of the tube by means of an annular electric furnace, the preheated evaporating zone thereby being maintained at a temperature ranging from 350° to 400°C, and the reaction zone being maintained at 400°C. From the upper inlet part of the reaction tube, a mixture of about 52 cc (60 g) per hour of N-($\beta$-hydroxyethyl)-2-pyrrolidone and about 17 $l$ per hour of nitrogen, a carrier gas, was introduced at a space velocity of 1,800 (hour)$^{-1}$ to be reacted for 2.5 hours. The reaction product in gas state was condensed and completely collected in a condenser cooled with ice water and in a trap cooled with dry ice and acetone.

When the reaction product thus obtained in liquid state was analyzed by gas chromatography, it was found that the conversion of N-($\beta$-hydroxyethyl)-2-pyrrolidone was 31.7 mole percent, and the yield of N-vinylpyrrolidone based on the reacted N-($\beta$-hydroxyethyl)-2-pyrrolidone was 62.8 mole percent. Furthermore, the yields of 2-pyrrolidone, N-ethylpyrrolidone, and other polymers based on the reacted N-($\beta$-hydroxyethyl)-2-pyrrolidone were 62.8, 11.2, 1.2, and 22.8 mole percent, respectively.

Example 1

300 g of zirconyl nitrate ($Z_rO(NO_3)_2 \cdot 2H_2O$) was dissolved in 500 cc of distilled water, and to the resulting solution, under intense agitation, was dropped 500 g. of dilute ammonia water prepared by diluting 500 g of 28-percent ammonia water with distilled water to form 1 liter of the dilute ammonia water. Thereafter, the pH value of the solution was found to be 11.

The hydroxide thus obtained was separated by a centrifugal separator, and the hydroxide was thereafter dried out at 100°C for 10 to 24 hours. The precipitate thus obtained was then calcined in a muffle furnace at 500°C for 2 hours to be oxidized and then ground into particles of from 50 to 200 mesh size, which are thereafter formed into tablets. Finally, the tablets were sintered at 700°C for 2 hours to be fabricated into a zirconium oxide catalyst.

30 cc of this zirconium oxide catalyst was placed in a reaction tube of the same specification as in the Reference Example. The preheated evaporating zone was maintained at a temperature of from 300° to 350°C, and the reaction zone thereof was maintained at 350°C. N-($\beta$-hydroxyethyl)-2-pyrrolidone was supplied to the reaction tube at a rate of 60 g/hour together with nitrogen as carrier (at 19$l$/hour), whereby a total space velocity of 1,800 hour$^{-1}$ was obtained, and the mixed gas was caused to react for about 2.5 hours.

When liquid products obtained during a reaction period from 1.5 to 2.5 hours were analyzed by gas chromatography, it was found that the conversion of the N-($\beta$-hydroxyethyl)-2-pyrrolidone was 95.7 mole percent, and the yields of the N-vinylpyrrolidone, 2-pyrrolidone, and other polymers based on the thus reacted N-($\beta$-hydroxyethyl)-2-pyrrolidone were 73.8 mole percent, 22.2 mole percent, and 1.1 mole percent, respectively.

Examples 2, 3, and 4

In these examples, catalysts prepared as described in Example 1 but baked at different temperatures were employed, and the yields of N-vinylpyrrolidone and 2-pyrrolidone were as shown in Table 1.

Table 1

| Example | Catalyst baking temp. (°C) | Conversion of N-($\beta$-hydroxyethyl) pyrrolidone(mole %) | Selectivity with respect to products (mole %) | |
|---|---|---|---|---|
| | | | N-vinylpyrrolidone | 2-pyrrolidone |
| 2 | 500 | 98.4 | 59.4 | 38.5 |
| 1 | 700 | 95.7 | 73.8 | 22.2 |
| 3 | 800 | 70.7 | 91.5 | 8.5 |
| 4 | 900 | 59.4 | 91.2 | 8.8 |

All of the other reaction conditions in the above described examples were identical to these employed in Example 1.

Examples 5, 6, 7, and 8

A catalyst made of zirconium oxide and prepared as specified in Example 4 was employed, but the reaction temperature and the spsce velocity were varied. The results thus obtained are shown in Table 2.

Table 2

| Example | Reaction temperature (°C) | Space velocity (hour)-1 | Conversion of N-(β-hydroxyethyl) pyrrolidone (mole %) | Selectivity with respect to products (mole %) | |
|---|---|---|---|---|---|
| | | | | N-vinyl pyrrolidone | 2-pyrrolidone |
| 5 | 350 | 900 | 63.0 | 86.3 | 3.4 |
| 6 | 370 | 900 | 88.6 | 92.6 | 5.6 |
| 7 | 370 | 1,800 | 69.4 | 87.9 | 3.3 |
| 8 | 390 | 1,800 | 89.2 | 84.3 | 5.6 |

In Table 2, the conversions and selectivities indicated are mean values obtained for a period of from 4 hours to 6 hours from the start of the reaction.

Example 9

30 cc of a thorium oxide catalyst which was produced from thorium nitrate (Th (NO$_3$)$_4$ · 4H$_2$O) and ammonia water through a method similar to that set forth in Example 1 for obtaining a zirconium oxide catalyst was placed in a reaction tube of a similar construction as that described in the Reference Example, and the N-(β-hydroxyethyl)-2-pyrrolidone was caused to react for about 2.5 hours under conditions similar to those described in Example 1.

When the liquid product obtained in a period between 1.5 hours and 2.5 hours from the start of the reaction was analyzed, it was found that the conversion of the N-(β-hydroxyethyl)-2-pyrrolidone was 59.3 mole percent, and yields of N-vinylpyrrodidone and 2-pyrrolidone based on the thus reacted N-(β-hydroxyethyle)-2-pyrrolidone were 71.5 mole percent and 27.5 mole percent, respectively. It was observed that substantially no polymer products were obtained in this example.

Example 10.

30 cc of zirconium oxide catalyst produced in a manner similar to that in Example 1 was employed, and the reaction was continued for 50 hours under similar conditions. The results thus obtained are shown in Table 3.

10, the temperature of the reaction zone was raised to 500°C, and air diluted with nitrogen was passed therethrough for 2 hours at a rate of 10 l/hour. Thereafter, the temperature of the reaction zone was lowered to 350°C, and the reaction as described in Example 10 was carried out for a further 4 hours. The liquid products obtained during the period of 3 to 11 hours after the start of the reaction were analyzed. As a result, it was found that the conversion of N-(β-hydroexyethyl)-2-pyrrolidone was 91 mole percent, and the yields for N-vinylpyrrolidone and 2-pyrrolidone, respectively, based on the reacted N-(β-hydroxyethyl)-2-pyrrolidone were 72.5 and 18 mole percent. The activity of the catalyst had completely recovered to its initial extent.

Example 12

500 g of cerous nitrate (Ce (NO$_3$)$_3$ · 6H$_2$O) was dissolved in 500 cc of pure water. Separately, 300 cc of 28 percent ammonia water was diluted with pure water to obtain 800 cc of diluted ammonia water. The ammonia water thus obtained was dropped into the cerous nitrate solution while the solution was stirred vigorously. After completion of the mixing, the pH value of the mixture was found to be 10. The hydroxide thus produced was separated with a centrifugal separator and was dried out for a period of from 10 to 24 hours at 110°C. The precipitate was further baked in a muffle furnace for 2 hours at 500°C and thereby transformed into cerium oxide (CeO$_2$), which was then ground into a grain size ranging from 10 to 100 meshes. The cerium oxide thus ground was then formed into tablets measuring 5 × 5 mm, which were sintered at 700°C for 2 hours.

30 cc of the cerium oxide catalyst thus prepared was placed in a reaction tube similar to that employed in the Reference Example. The preheated evaporating re- Table 3

| Time from start of reaction, hour | 10 | 20 | 30 | 40 | 50 |
|---|---|---|---|---|---|
| Conversion of N-(β-hydroxyethyl)-2-pyrrolidone, mole % | 94 | 90 | 87.5 | 84 | 80 |
| Yield of N-vinylpyrrolidone based on reacted N-(β-hydroxyethyl)-2-pyrrolidone, mole % | 73 | 81 | 89.5 | 91.5 | 90.5 |
| Yield of 2-pyrrolidone based on reacted N-(β-hydroxyethyl)-2-pyrrolidone, mole % | 18 | 11.5 | 9.0 | 8.0 | 5.5 |

The values of yields in this table are average values for the liquid products obtained during the period from 4 hours prior to the time indicated.

Example 11

After 50 hours of operation as indicated in Example gion of the reaction tube was maintained at a temperature from 300° to 350°C, and the reaction zone thereof was maintained at 350°C. N-(β-hydroxyethyl)-2-pyrrolidone was then introduced into the inlet port of the reaction tube at a rate of 64.5 g/hour together with 19 l/hour of carrier nitrogen and was caused to react for 4 hours. After the completion of the reaction, the entire product in liquid state was analyzed by gas chromatography. As a result, it was found that the conversion of the N-(β-hydroxyethyl)-2-pyrrolidone was 53.8 mole percent, and yields of N-vinylpyrrolidone and 2-pyrrolidone based on the reacted N-(β-hydroxyethyl)-2-pyrrolidone were 89.5 mole percent and 6.3 mole percent, respectively.

Example 13

A cerium oxide catalyst was prepared as described in Example 12 except for a final baking at 900°C for 2 hours. 30 cc of this catalyst was placed in a reaction tube similar to that described in the Reference Example. The preheating-evaporating zone of the reaction tube was maintained at a temperature of from 250° to 300°C, and the reaction zone thereof was maintained at 350°C. N-(β-hydroxyethyl)-2-pyrrolidone was introduced from the inlet port of the reacting tube at a rate of 3.3 g/hour together with nitrogen as a carrier supplied at a rate of 9.5 l/hour.

After reaction for 4 hours, all of the product in liquid state was analyzed by gas chromatography, whereupon it was found that the conversion of the N-(β-hydroxyethyl-2-pyrrolidone was 56.0 mole percent, and yields of N-vinylpyrrolidone and 2-pyrrolidone based on the reacted N-(β-hydroxyethyl)-2-pyrrolidone were 79.4 mole percent and 12.0 mole percent, respectively.

Example 14

Still another kind of catalyst consisting essentially of zinc oxide was prepared in a manner substantially similar to that set forth in Example 12 except that zinc nitrate [Zn(NO$_3$)$_2$ · 6H$_2$O] was employed therein instead of the cerous nitrate.

About 30 cc of the zinc oxide catalyst baked at 700°C for 2 hours was placed in the reaction tube of a construction as described in the Reference Example. The preheating-evaporating zone of the reaction tube was maintained at a temperature of from 250° to 300°C, and the temperature of the reacting region was maintained at 350°C. 64.5 g/hour of N-(β-hydroxyethyl)-2-pyrrolidone and 19 l/hour of carrier nitrogen were supplied into the inlet port of the reactor and caused to react for 4 hours.

After the completion of the reaction, all of the liquid products were analyzed in a gas chromatography. As a result, it was found that the conversion of the N-(β-hydroxyethyl)-2-pyrrolidone was 17.2 mole percent, and the yields of the N-vinylpyrrolidone and 2-pyrrolidone based on the reacted N-(β-hydroxyethyl)-2-pyrrolidone were 88.5 mole percent and 7.4 mole percent, respectively.

Example 15

A catalyst and a reaction tube similar to those described in Example 14 were employed, and the reaction was continued for 4 hours with the temperature of the reaction zone maintained at 400°C. As a result, it was found that the conversion of the N-(β-hydroxyethyl)-2-pyrrolidone was 33.1 mole percent, and yields of the N-vinyl pyrrolidone and 2-pyrrolidone with respect to the reacted N-(β-hydroxyethyl)-2-pyrrolidone were 88.2 mole percent and 3.7 mole percent, respectively.

Example 16

A chromium oxide catalyst was prepared in a manner similar to that described in Example 12 with the use of chromium nitrate [Cr(NO$_3$)$_3$ · 9H$_2$O] and diluted ammonia water and baked at 700°C for two hours. 30 cc of this catalyst was placed in a reaction tube similar to that described in the Reference Example, and the preheating-evaporating zone and the reaction zone of the reaction tube were heated respectively to temperatures in a range of from 250° to 300°C and at 400°C. N-(β-hydroxyethyl)-2-pyrrolidone was then supplied at a rate of 60 g/hour into the reaction tube together with carrier nitrogen supplied at 19 l/hour, and the reaction was continued for 2.5 hours. Liquid products obtained in a period between 30 minutes and 2.5 hours after the start of the reaction were analyzed by gas chromatography. As a result, it was found that the conversion of the N-(β-hydroxyethyl)-2-pyrrolidone was 19.3 mole percent, and the yields of N-vinylpyrrolidone and 2-pyrrolidone based on the reacted N-(β-hydroxyethyl)-2-pyrrolidone were 85.8 mole percent and 7.6 mole percent respectively.

Example 17

Hydroxide gels obtained when zinc nitrate and chromium nitrate were reacted with diluted ammonia water were mixed together in a ratio of 3 : 1 (calculated as oxides), and the mixed gels were further kneaded in a kneader and dried out at 100°C for 10 hours. The hydroxide mixture thus dried out was heated in a muffle furnace at 500°C for 2 hours, whereupon a mixture of zinc oxide and chromium oxide was obtained. This mixture was then ground into grain sizes ranging from 10 to 100 meshes and then formed into tablets of 5-mm × 5-mm size, which were then baked at 700°C for 2 hours.

30 cc of the catalyst thus prepared containing zinc oxide and chromium oxide in a ratio of 3 : 1 was placed in a reaction tube of a construction similar to that described in the Reference Example. The preheating-evaporating zone and the reaction zone of the reaction tube were maintained in a temperature range from 200° to 300°C and at a temperature of 375°C, respectively, and N-(β-hydroxyethyl)-2-pyrrolidone was supplied at a rate of 64.5 g/hour together with nitrogen carrier supplied at a rate of 19 l/hour.

After 4 hours of the reaction described above, all of the liquid products were analyzed by gas chromatography. As a resuult it was found that the conversion of N-(β-hydroxyethyl)-2-pyrrolidone was 63.5 mole percent, and the yields of the N-vinyl pyrrolidone and 2-pyrrolidone with respect to the reacted N-(β-hydroxyethyl)-2-pyrrolidone were 94.4 mole percent and 2.7 mole percent, respectively.

We claim:

1. A method for producing N-Vinylpyrrolidone from N-(β-hydroxyethyl)-2-pyrrolidone which comprises heating the N-(β-hydroxyethyl)-2-pyrrolidone at a temperature in the range 250° to 500°C in the presence of a catalyst essentially consisting of an oxide of a metal selected from the group consisting of zirconium, thorium, cerium, zinc, and chromium at atmospheric pressure; in the gaseous phase; at a space valocity of from 500 to 5,000 hr$^{-1}$ said metal oxide catalyst having been baked at a temperature ranging from 500° to 1200°C.

2. A method as defined in claim 1 wherein said metal oxide is obtained by pyrolysis of a corresponding hydroxide.

3. The method according to claim 1 wherein said metal is zirconium.

4. The method according to claim 1 wherein said metal is thorium.

5. The method according to claim 1 wherein said metal is cerium.

6. The method according to claim 1 wherein said metal is zinc.

7. The method according to claim 1 wherein said metal is chromium.

* * * * *